United States Patent [19]
Jesiek

[11] Patent Number: 6,010,216
[45] Date of Patent: Jan. 4, 2000

[54] "HEAR SPEAK" TWO-WAY VOICE RADIO COMMUNICATIONS EYEGLASSES

[76] Inventor: Daniel Stephen Jesiek, G 4264 Branch Rd., Flint, Mich. 48506

[21] Appl. No.: 08/530,018

[22] Filed: Sep. 19, 1995

Related U.S. Application Data

[63] Continuation-in-part of application No. 08/300,062, Sep. 2, 1994, abandoned, which is a continuation of application No. 08/005,719, Jan. 19, 1993, abandoned.

[51] Int. Cl.$^7$ ................................................. G02C 1/00
[52] U.S. Cl. ............................ 351/158; 381/68.5; 455/79
[58] Field of Search ............................... 351/158; 455/79, 455/83; 381/68.5

[56]           References Cited

U.S. PATENT DOCUMENTS

| | | | |
|---|---|---|---|
| 4,683,587 | 7/1987 | Silverman | 351/158 |
| 4,902,120 | 2/1990 | Weyer | 351/158 |
| 5,404,385 | 4/1995 | Ben-Haim | 351/158 |
| 5,563,951 | 10/1996 | Wang et al. | 381/24 |
| 5,606,743 | 2/1997 | Vogt et al. | 351/158 |

FOREIGN PATENT DOCUMENTS

| | | | |
|---|---|---|---|
| 2272073 | 5/1994 | United Kingdom | 351/158 |

Primary Examiner—Huy Mai

[57]           ABSTRACT

Eyeglasses including a radio receiver, a radio transmitter, power supply, antenna and earphones. Said receiver, transmitter, power supply, and antenna are within the bow pieces. The antenna is a wire within the framework and extends from the rear end of one bow piece, passing through the front framework, to the rear end of the other bow piece, and is electrically connected to said transmitter and receiver circuitry. The invention, however, is not intended to be restricted to any particular construction, therefore in some but not all applications, another means to emit, or radiate, the radio waves may be used instead of the "wire" antenna. The earphones are external, and are electrically connected to said circuitry by wires entering into the bow pieces through a hole in each portion of said bow pieces. For the purpose of decreasing audible noise produced outside said eyeglasses, that would otherwise be heard by the user, even with the earphones inserted in their ears, said earphones, in some but not all applications, have the outside body covered with a sound insulating material, there-by serving as hearing protection. This construction of said earphones allows the user interference free two way radio communications, by speaking and hearing. When said user speaks, their voice travels up their Eustachian tube, and is picked up by the earphone inserted in their ear canal. The signal is carried to the transmitter by wires, where it is transmitted to another user of said eyeglass devices.

3 Claims, 6 Drawing Sheets

"HEAR SPEAK" TWO-WAY VOICE RADIO COMMUNICATIONS EYEGLASSES

This application is a CIP of the application Ser. No. 08/300,062 filed on Sep. 2, 1994, now abandoned, which is a continuation of the application Ser. No. 08/005,719 filed on Jan. 19, 1993, now abandoned.

TECHNICAL FIELD OF THE INVENTION

The present invention relates to the general art of two-way voice radio communications and to the particular field of combinations which include two-way voice radio communications equipment.

BACKGROUND OF THE INVENTION

The "Hear-Speak Eyeglasses" (including any kind of eyeglasses, even toys) are a form of two-way voice radio communications. The radio communications equipment is in the glasses frames. The applications of this form of communications can range from a childs toy, to a soldiers life saver. It can be incorporated in safety glasses for industry, sunglasses for eye protection such as motorcycle riders would use, or for private conversation without hearing outside noise in such enviornments as restaurants, auto race tracks, etc. Depending on the application, the designs would vary. Some would have one earphone, while others would have two. Some of the earphones would be covered with a sound insulating material for use in a noisy environment. On some occasions a worker in a noisy industrial plant may leave the noisy environment and enter a quiet office to communicate with a person working in the office. The design of such "Hear-Speak" eyeglasses would have an ambient sound switch to allow the user to switch to outside sound. This would enable the user to leave the glasses on and earphones plugged in their ears. It is apparent that this invention could be a life saver in many applications.

OBJECTS OF THE INVENTION

It is an object of the present invention to provide convenient, hands free, two-way radio communications, usable by persons in a variety of work and other activities.

It is another object of the present invention to provide convenient hands free two-way voice radio communications which provide both eye and hearing protection.

It is another object of the present invention to provide convenient hands free two-way voice radio communications in the form of eyeglasses with rechargable batteries and solar batteries.

SUMMARY OF THE INVENTION

These, and other, objects are achieved by the combination of, two-way voice activated radio communications equipment and eyeglasses frames in a manner that well keep the eyeglasses comfortable to the user, even for long periods of time. This would be accomplished by removing an amount of frame material, equal in weight, to the weight of electronic circuitry to be added. That is to say, said circuitry will be designed to weigh as much, or less than, the material removed to integrate said circuitry into eyeglass frames. (The complete frames, including that which holds the lens.)

BRIEF DESCRIPTION OF THE DRAWING FIGURES

FIG. 1 Perspective view of combination eyeglasses and two-way voice radio communications embodying the present invention.

Figure 5:
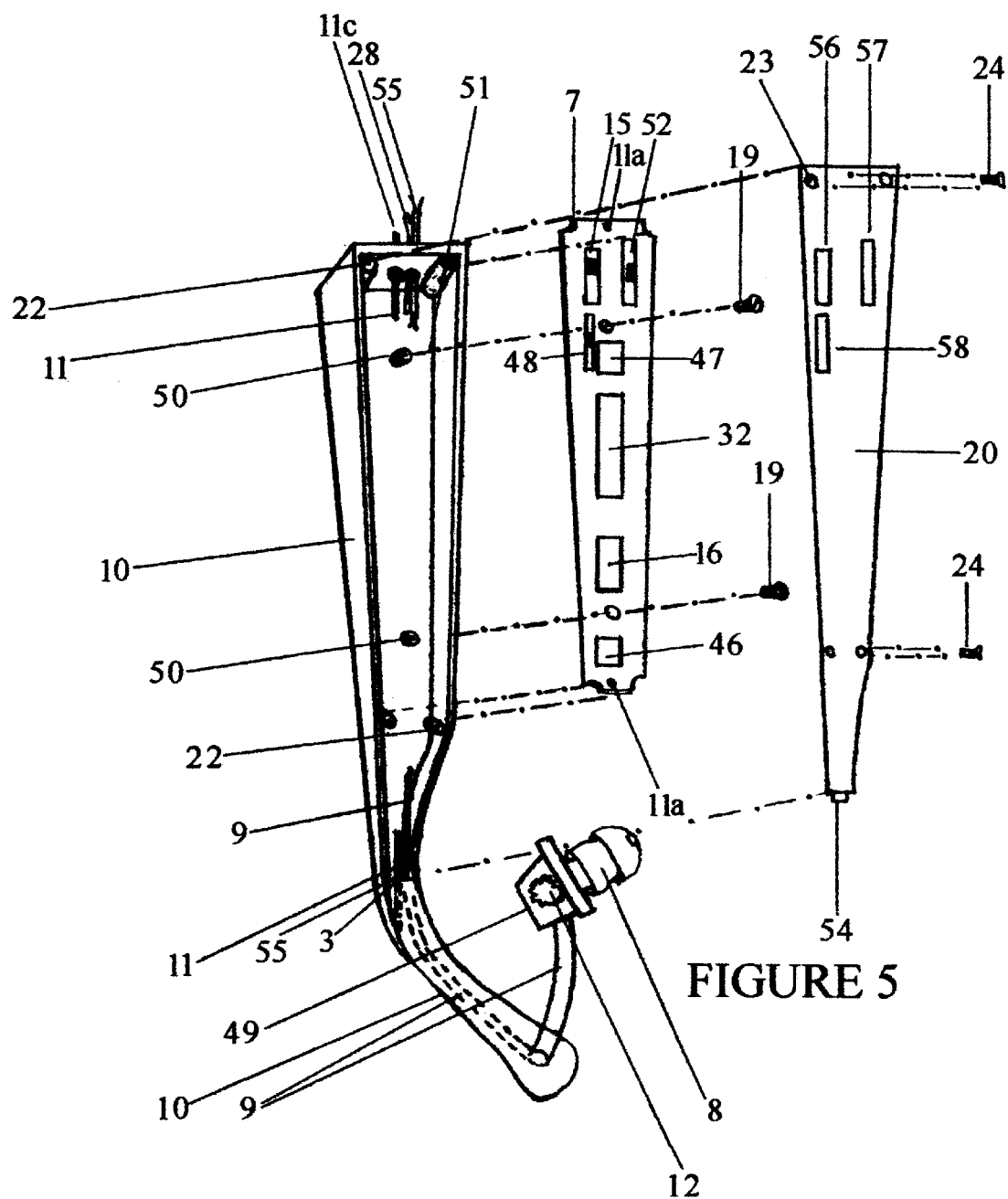

FIG. 5 is a perspective view of the right side eyeglass frame showing both the transmitter and the reciever circuitry on the same surface mount printed circuit board, as well as the voice activation and ambient sound amplifier. A metalic paint coats the internal back of eyeglass frames to disallow high frequency radiation from entering the users head, a safety precaution. This same metalic coating also serves as the ground plain for the transmitter circuit.

Figure 6:
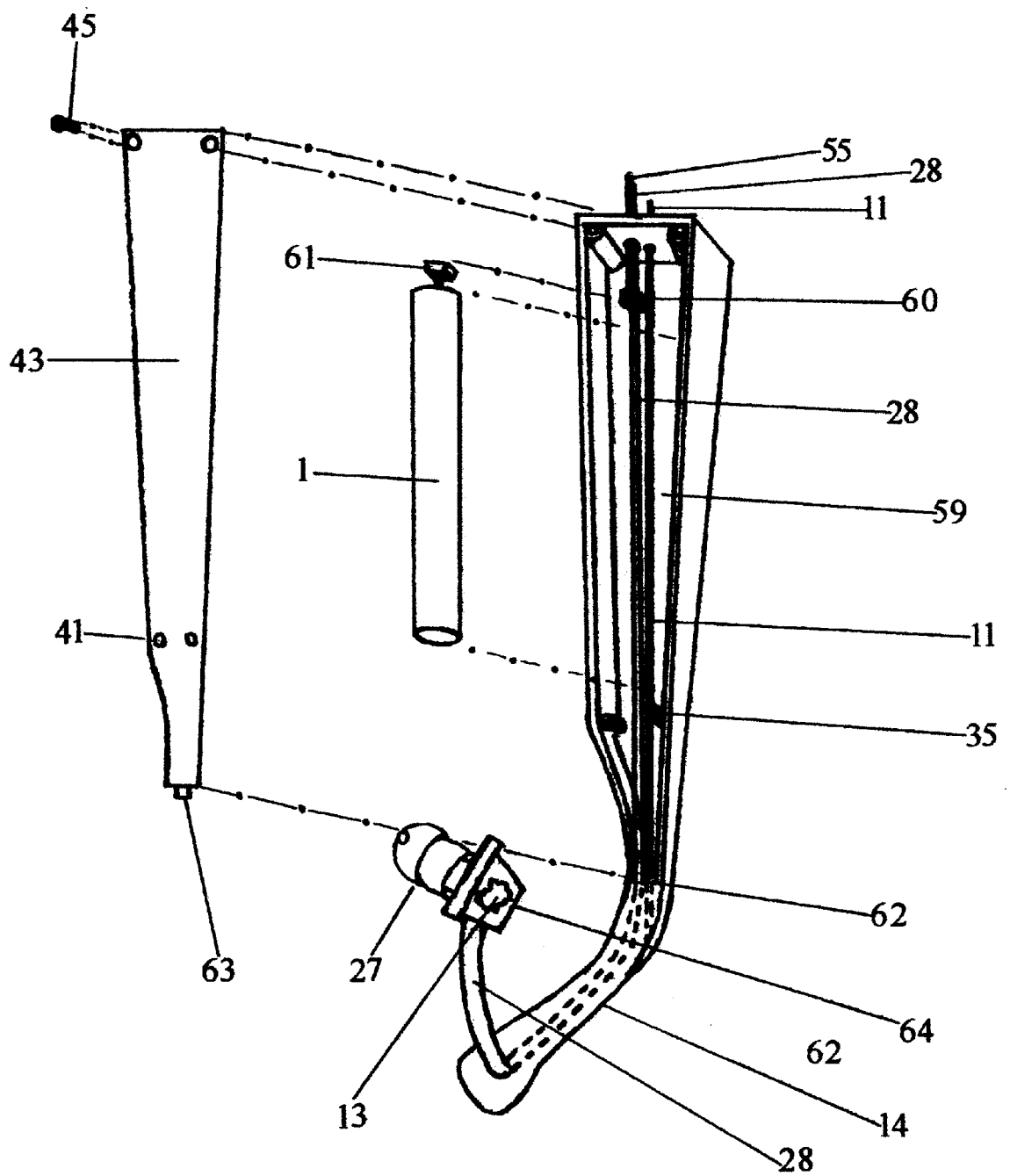

FIG. 6 is a perspective view of the left side eyeglass frame showing how the battery, antenna, power wires, and left earphone wires are-arranged in the eyeglass frame. A metalic paint coats the internal back of eyeglass frames to disallow high frequency radiation from entering the users head, a safety precaution. This same metalic coating also serves as the ground plain for the transmitter circuit.

DETAILED DESCRIPTION OF THE PREFERRED EMBODIMENT OF THE INVENTION

Referring to FIG. 5, a metallic paint 51 coats the internal back of eye glass frame 10. circuit board 7 fastens to eye glass frame 10 at points 50, by two screws 19 which pass through circuit board 7. Antenna 11 connects to each end of circuit board 7 at points 11a. Power supply wires 55 supply power to circuit board 7 by connecting to circuit board 7 at one point and power switch 15. Earphone wires 9 pass through hollow eyeglass frame 10 and connects to circuit board 7.

Figure 1:
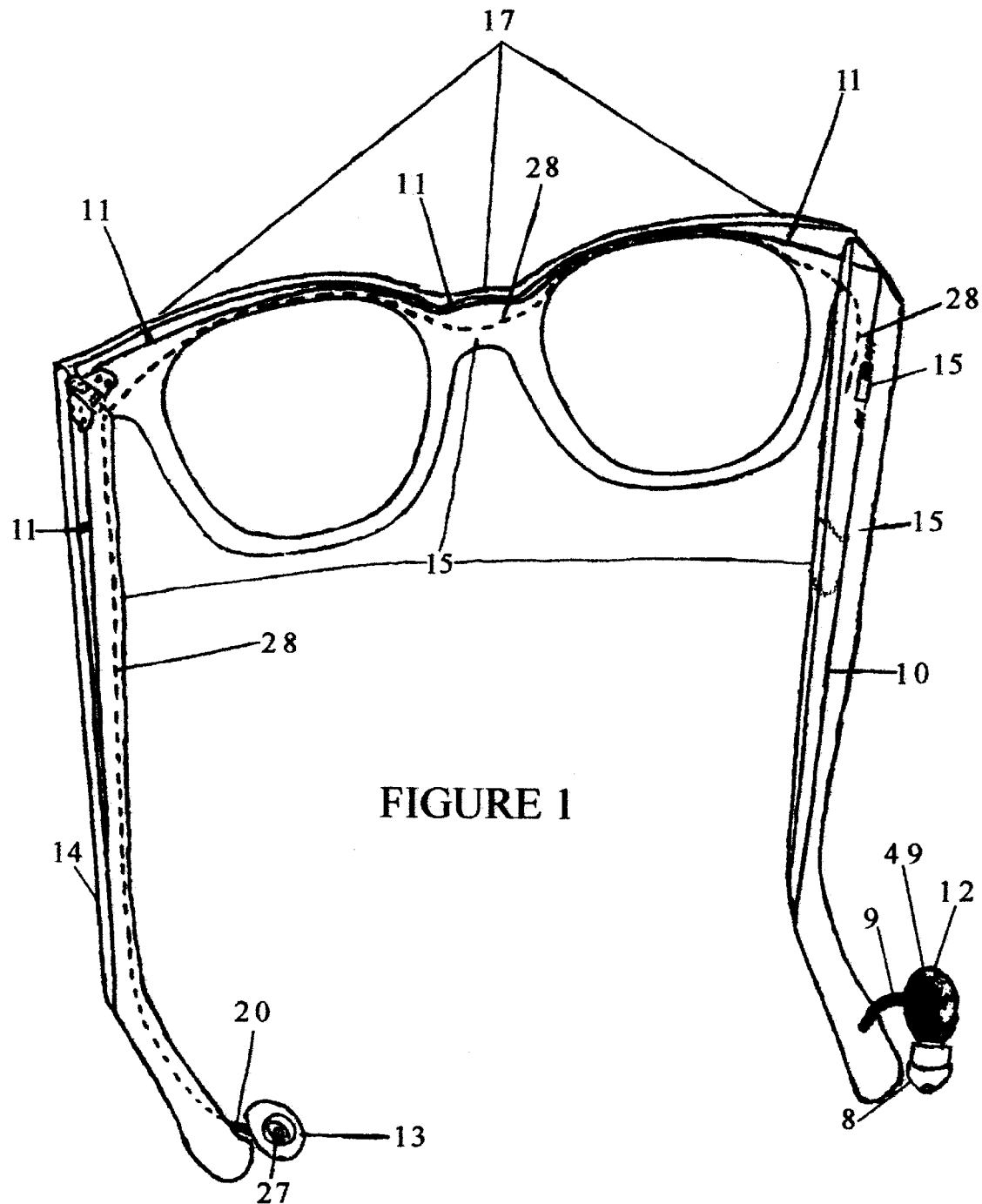

Referring to FIG. 1, FIG. 6 and FIG. 5, earphone wires 28 pass through hollow eyeglass frame 14 and on through hollow eyeglass frame 17, then into hollow eyeglass frame 10 and are connected to circuit board 7. Battery 1 is fitted into eyeglass frame 14 and plugs into power supply wires 55 at wire connectors 60 and 61. Power supply wires 55 pass through hollow eyeglass frame 17 and into hollow eyeglass frame 10 and connect to power switch 15 and circuit board 7. Antenna 11 passes through hollow eyeglass frames 14, 17, 10, and connects to circuit board 7. The antennas length will vary according to the frequency the transmitter and receiver is to operate at. Earphone 13 is coated with a sound insulating material 64 and is connected to earphone wire 28. Eyeglass frame 14, cover 43, is fastened to frame 14 at points 35 by four screws 45 passing through cover 43 at points 41, tab 63 slipping into frame 14 at point 62. Eyeglass frame 10, cover 20 is fastened to frame 10 at poin 22, by four screws 24 passing through cover 20 at points 23. Access to switches 15 and 52 and control 48 are gained through openings in cover 20, shown as 56, 57, and 58 respectively Earphone 12 is covered with a sound insulating material 49 and connects to earphone wires 9. Earphones 8 and 27 are interchangeable, and available in different sizes, and slip onto earphones. When the power is turned on the "Hearspeak" two way radio communications eyeglasses well be in the receiver mode. (circuit 32 on circuit board 33) In this mode the user is able to hear a voice communications transmitted from a transmitter using the same radio frequency. This transmission will penetrate, and or, radiate through free space, air, wood, vacuum, gasses, most liquids and some solids, and is called radio frequency or RF. When RF is used in the present invention there are no wires connected from one device to the other. The "Hearspeak" two way voice radio communications eyeglasses are not designed to be a hearing aid for the "hearing impaired" When the user speaks, the voice activated switch 46 turns the users RF receiver 32 off, and turns the users RF transmitter 16 on. The users voice is radiated from the antenna, or by light wave through "free space" where it is received by another RF receiver operating at that frequency. In the event the user wishes to communicate with someone in a noise free environment there is an ambient sound switch 52 and ambient sound amplifier 47 to allow audio frequency reception without removing the earplugs. the earphone serves as a microphone in the RF voice transmission mode. 48 is a volume control.

TRANSMITTER CIRCUITRY

Figure 2:
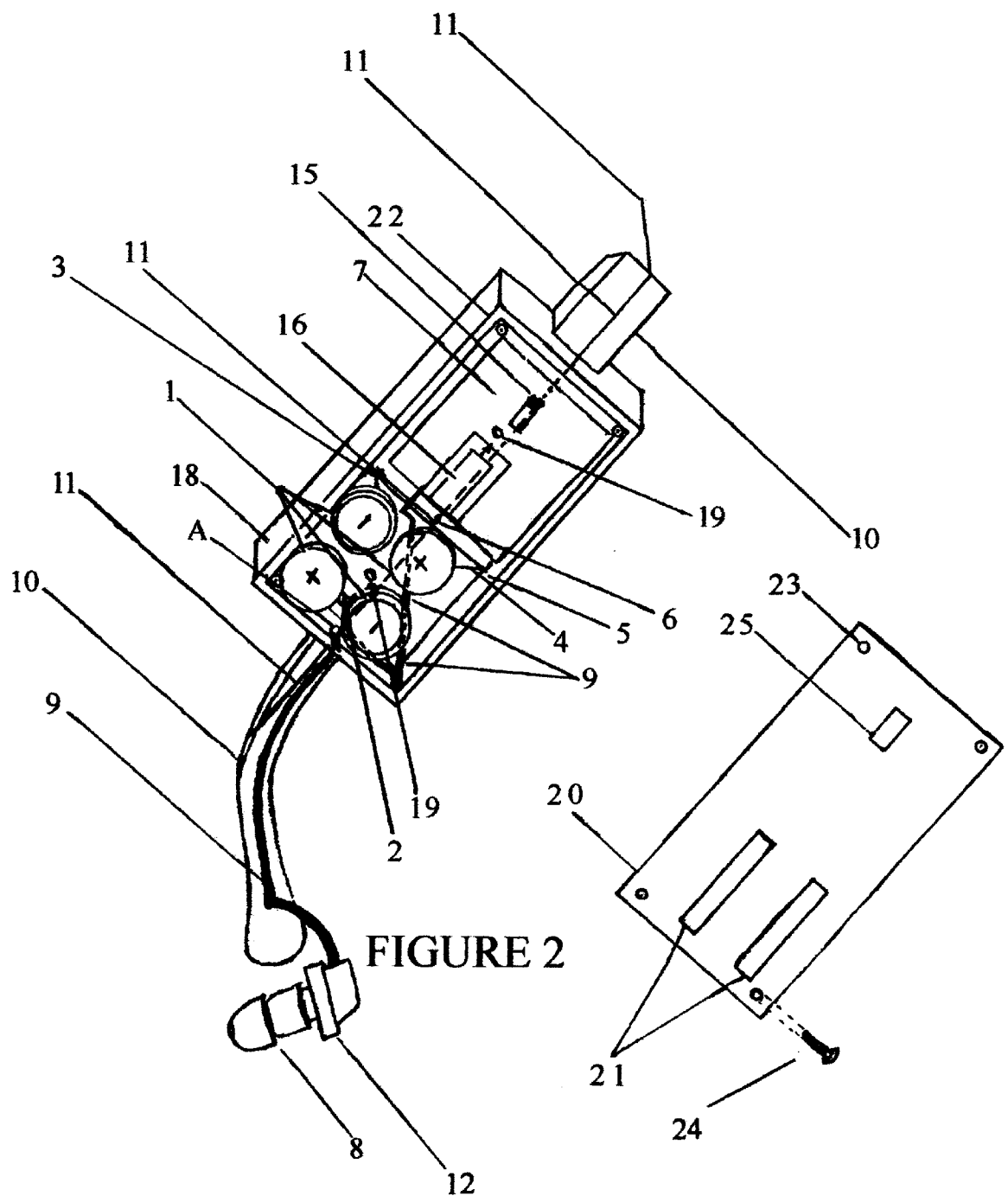
FIG. 2 is a detailed perspective view of the right side eyeglass frame, with a blown up portion showing how the transmitter circuitry could be integrated

Referring to FIG. 2, screws 19 pass through eye glass frame 10 fastening eye glass frame 10 to enclosure 18. Enclosure 18 houses power supply 1, consisting of four small batteries connected in series by connector 2, and enclosure cover terminal contacts 21. The power is supplied to the printed circuit board 6 by power supply wires 3 and 4. (Note edge of circuit board 5) The MC2833D surface mount IC transmitter chip 16 is connected to related discrete electronic components and off/on switch 15. Said electronic components are connected to circuit 7 (shaded area) which is the same circuit board as 6, but used for discrete electronic components needed to build the complete transmitter circuit.

Referring again to FIG. 2, the earphone, and or, microphone unit 12 is a device that can be purchased from Radio Shack Tandy Corp. This device 12 operates as an earphone. This device 12, also operates as a microphone. In the transmitter portion of the invention, FIG. 2, unit 12 is used as a microphone. Earplug 8 is a removable part of microphone 12 and is available in a number of sizes to adapt microphone 12 to the users needs. It will be necessary to cover both earphones, and/or, microphones with sound deadening substance to disallow the devices, (FIG. 2) and 13, (FIG. 1) to pick up ambient sound. Wire cable (containing two wires) 9 is connected to microphone 12 and circuit board 7, via a hollowed out portion on eye glass frame 10 and entering enclosure 18 at point A. Antenna 11 begins at bend of eye glass frame 10 and continues through hollowed out portion of eye glass frame 10. Said antenna is connected to circuit board 6 at 11a and continues through eye glass frame 10. Said antenna enters eye glass frame 17 (FIG. 1) after leaving eye glass frame 10 (FIG. 2), as can be seen at points 11b and 11c. Said antenna continues through eye glass frame 17 (FIG. 1) and enters eye glass frame 14. The total length of the antenna is approximately eighteen inches. Referring to FIG. 2, enclosure cover 20 is fastened to enclosure 18 by four screws 24 at the four corners 22, after passing through enclosure 20 at the four corners 23. Access to off/on switch 15 is gained through opening 25 in enclosure cover 20.

RECEIVER CIRCUITRY

Figure 3:
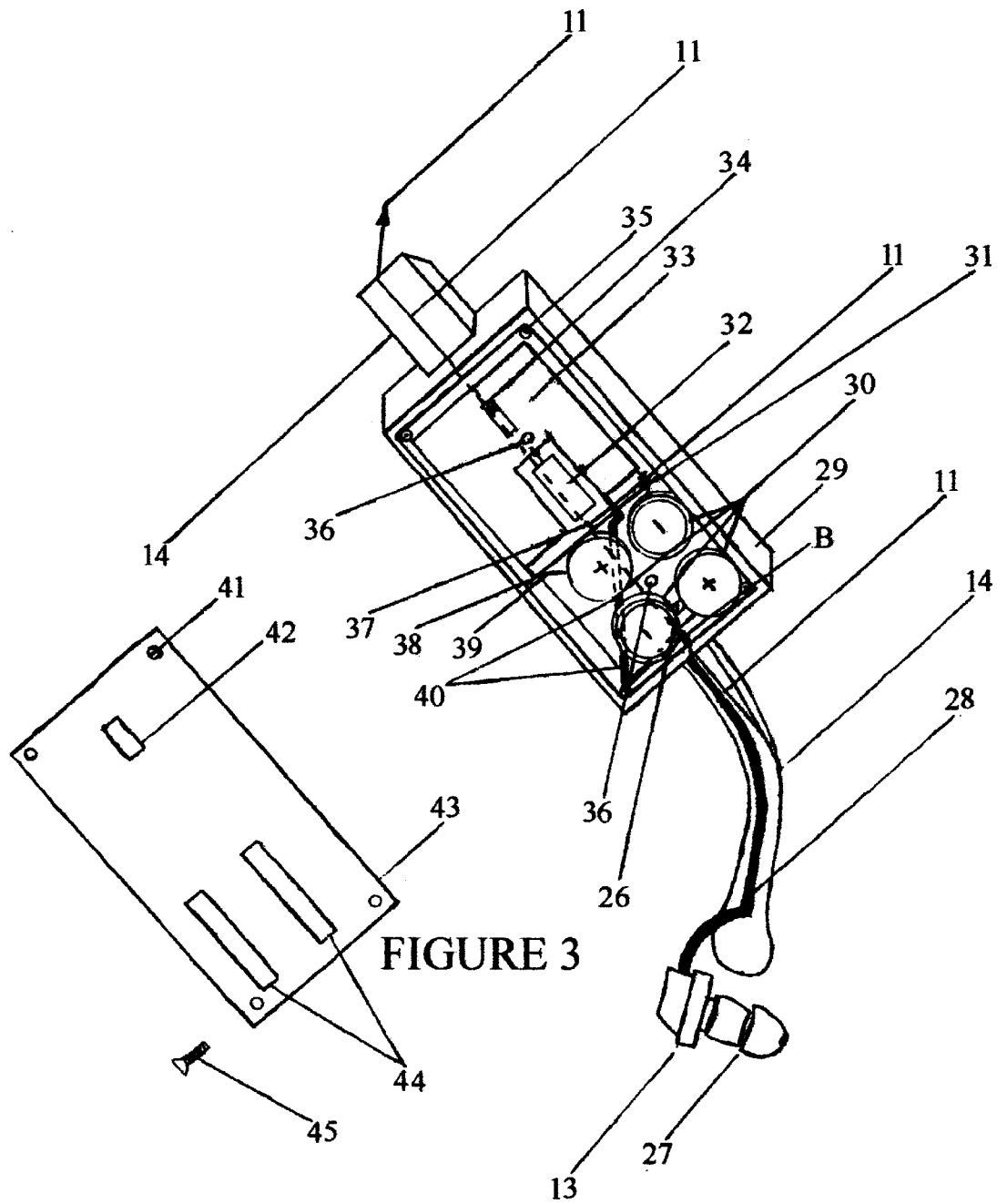
FIG. 3 is a detailed perspective view of the left side eyeglass frame, with a blown up portion showing how the reciever circuitry could be integrated.
Figure 4:
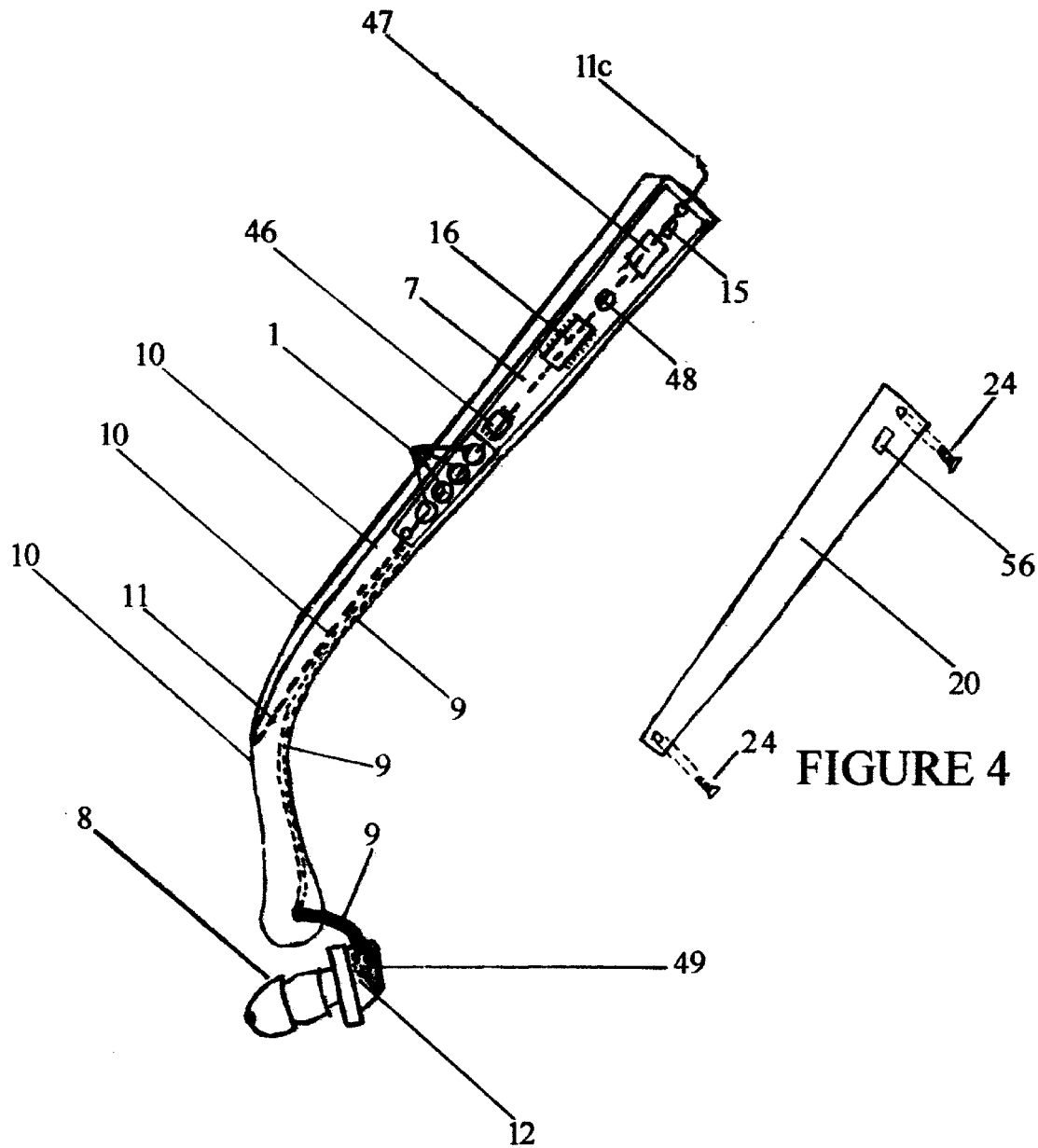
FIG. 4 is another perspective view showing another method to integrate the transmitter circuitry, but with the addition of a voice activated switch chip to switch from the reciever mode to the transmitter mode. The reciever being in the opposite eyeglass frame.

Referring to FIG. 3, screws 36 pass through eye glass frame 14 fastening eye glass frame 14 to enclosure 29. Enclosure 29 houses power supply 30, consisting of four small batteries connected in series by connector 26, and enclosure cover terminal contacts 44. The power is supplied to the printed circuit board 37 by power supply wires 31 and 39. (Note edge of circuit board 38) The MC3335DW surface mount IC receiver chip 32 is connected to related discrete electronic components and off/on switch 34. Said electronic components are connected to circuit board 33 (shaded area) which is the same circuit board as 37, but used for discrete electronic components needed to build the complete receiver circuit.

Referring again to FIG. 3, the earphone, and/or, microphone unit 13 is a device that can be purchased from Radio Shack Tandy Corp. This device 13 operates as an earphone. This device 13, also operates as a microphone. In the receiver portion of the invention, FIG. 3, unit 13 is used as an earphone. earplug 27 is a removable part of earphone 13 and is available in a number of sizes to adapt earphone 13 to the users needs. It will be necessary to cover both earphone, and/or microphones with sound deadening substance to disallow the device 12, (FIG. 2) and 13, (FIG. 3) to pick up ambient sound. Wire cable (containing two wires) 28 is connected to earphone 13 and circuit board 33, via a hollowed out portion on eye glass frame 14 and entering enclosure 29 at point B. Antenna 11 begins at bend of eye glass frame 14 and continues through hollowed out portion of eye glass frame 14. Said antenna is connected to circuit board 37 at 11a and continues through eye glass frame 14. Said antenna enters eye glass frame 17 (FIG. 1) after leaving and 11c. Said antenna continues through eye glass frame 17 FIG. 1, and enters eye glass frame 10. The total length of the antenna is approximately eighteen inches.

Referring to FIG. 3, enclosure cover 43 is fastened to enclosure 29 by four screws 45 at the four corners 35, after passing through enclosure cover 43 at the four corners 41. Access to off/on switch 34 is gained through opening 42 in enclosure cover 43. The "Hear Speak" well have many uses, from a child's toy, a cyclists communication device, to an industrialist or soldiers life saver. Because of the many uses, it is necessary to have different designs for each use, some devices will have a voice activated switch, others will not. Some will transmit on light wave, others will not.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the Statutes for disclosure of an operative embodiment, but not to show all the various forms and modifications in which the invention might be embodied.

I claim:

1. A communication device that can both transmit and receive radio frequencies while allowing a user to communicate through hearing and speaking comprising: eyeglass having frames containing integrated radio communication circuitry and having a power supply and an earphone wherein said radio communication circuitry comprises an antenna, a transmitter including a voice activated switch chip to switch from a receiver mode to a transmitter mode, a receiver, a power switch and two controls attached to said eyeglass frames whereby said power switch turns said power supply on and off and one control controls volume of sound to earphone and the other control is for adjusting said radio frequencies of said communication device and having the earphone externally attached by wires.

2. A communication device that can both transmit and receive radio frequencies while allowing a user to communicate through hearing and speaking comprising: eyeglass having frames containing integrated surface mount radio communication circuitry and having a power supply and earphones wherein said radio communication device comprises an antenna, a transmitter including a voice activated switch to switch from a reciver mode to a transmitter mode, a receiver, two power switches and two controls attached to said eyeglass frames whereby said power switches switch power on or off and said controls control the volume of sound, and to control said radio frequencies of said communication device and having one or two earphone externally covered with sound insulating material.

3. A communication device that can both transmit and receive radio frequencies while allowing a user to communicate through hearing and speaking comprising: eyeglass having frames containing radio communication circuitry and having two power supplies and two earphones wherein said radio communication circuitry comprises means for radiating and detecting radio frequency through free space on light waves, a transmitter including a voice activated switch to switch from reciever mode to transmitter mode, a receiver, an ambient sound amplifier, power switches and controls attached to said eyeglass frames whereby said power switches switch said power supplies on and off and said controls control volume of sound, and to control said radio frequencies of said communication device and having two earphones externally covered with sound insulating material.

* * * * *